United States Patent [19]
Dishart et al.

[11] Patent Number: 5,670,966
[45] Date of Patent: Sep. 23, 1997

[54] GLASS ANTENNA FOR VEHICLE WINDOW

[75] Inventors: Peter T. Dishart, Pittsburgh; Frank J. Pazul, Lower Burrell; James F. Wilson, Worthington, all of Pa.

[73] Assignee: PPG Industries, Inc., Pittsburgh, Pa.

[21] Appl. No.: 364,869

[22] Filed: Dec. 27, 1994

[51] Int. Cl.[6] .................. H01Q 1/32; H01Q 1/38
[52] U.S. Cl. ............................. 343/713; 343/906
[58] Field of Search .................. 343/711, 712, 343/713, 704, 906; H01Q 1/32, 1/38

[56] References Cited

U.S. PATENT DOCUMENTS

| | | | |
|---|---|---|---|
| 3,638,225 | 1/1972 | Zawodniak | 343/713 |
| 3,655,545 | 4/1972 | Gillery et al. | 204/192 |
| 3,962,488 | 6/1976 | Gillery | 427/109 |
| 4,100,398 | 7/1978 | Levin | 219/541 |
| 4,707,700 | 11/1987 | Nagy | 343/713 |
| 4,768,037 | 8/1988 | Inaba et al. | 343/713 |
| 4,827,274 | 5/1989 | Armbruster | 343/712 |
| 4,849,766 | 7/1989 | Inaba et al. | 343/713 |
| 4,898,789 | 2/1990 | Finley | 428/623 |
| 5,005,020 | 4/1991 | Ogawa et al. | 343/713 |
| 5,083,135 | 1/1992 | Nagy et al. | 343/713 |
| 5,099,250 | 3/1992 | Paulus et al. | 343/713 |
| 5,208,444 | 5/1993 | Winter et al. | 219/547 |
| 5,355,144 | 10/1994 | Walton et al. | 343/713 |

FOREIGN PATENT DOCUMENTS

| | | |
|---|---|---|
| 0 297 813 | 1/1989 | European Pat. Off. . |
| 0 500 380 | 8/1992 | European Pat. Off. . |

*Primary Examiner*—Michael C. Wimer
*Attorney, Agent, or Firm*—Andrew C. Siminerio

[57] ABSTRACT

The present invention provides a transparent antenna for an automobile. The antenna includes a glass substrate a first electroconductive antenna element positioned on a central portion of a major surface of said substrate, a second electroconductive antenna element positioned on the major surface of the substrate, spaced from the first element, and at least one electroconductive connector extending between the antenna elements and overlaying and electrically interconnected with a portion of both the first and second antenna elements. A portion of the connector extends beyond the periphery of the glass substrate to be connected to an external connector. The first element and preferably both elements are a transparent, electroconductive coating. In one particular embodiment of the invention, the first element is spaced from the peripheral edge of the substrate and the second element is positioned between the first element and the substrate edge. The antenna may be incorporated into a laminated vehicle windshield so that an additional glass ply is secured to the first glass substrate such that the first and second coating elements are positioned between the glass plies.

21 Claims, 3 Drawing Sheets

GLASS ANTENNA FOR VEHICLE WINDOW

BACKGROUND OF THE INVENTION

The present invention relates to vehicle antennas and, in particular, to a glass antenna with a transparent coating covering selected portions of a vehicle window.

In the past, the traditional motor vehicle antenna for receiving and transmitting radio signals was a whip-type antenna. More recently, antennas have been incorporated into the vehicle structure. For example, U.S. Pat. No. 4,707,700 to Nagy positions an antenna within the roof structure of a vehicle. U.S. Pat. Nos. 4,768,037 and 4,849,766 to Inaba et al. use a transparent coating over a substantial portion of a window, and in particular a vehicle windshield, to form an antenna. U.S. Pat. No. 5,083,135 to Nagy et al. utilizes a transparent coating in the shape of a "T" to form an antenna. In each system, a connector arrangement conducts the radio wave signal received by the antenna to a receiver, e.g. a radio.

It has been found that various coating patterns may be combined to produce a glass antenna for a vehicle. However, such configurations present certain processing problems since typical coating processes coat most if not all of the glass sheet and, more specifically, the need to mask selected portions of the glass sheet to give the desired patterns. In particular, it is difficult to produce intricate deletion patterns using existing masking technology. One may use a reusable mask or selected portions of the glass may be coated with a material that is stripped after the antenna coating is applied to the glass sheet. However, it may be difficult to maintain sharp coating deletion lines at selected sections of the antenna, and in particular at those sections of the coating that interconnect coated areas forming the main antenna elements.

It would be advantageous to provide an antenna arrangement having multiple antenna coating elements that simplify the coating patterns, e.g. by eliminating the need to interconnect the coating elements comprising the antenna system.

SUMMARY OF THE INVENTION

The present invention provides a transparent antenna for an automobile. The antenna includes a glass substrate, a first electroconductive antenna element positioned on a major surface of the substrate, a second electroconductive antenna element positioned on the major surface of the substrate and spaced from the first element, and at least one electroconductive connector extending between the antenna elements and having first portions overlaying and being electrically interconnected with a portion of the first and second antenna elements and a second portion extending beyond the periphery of the glass substrate. The first element, and preferably both elements, are a transparent, electroconductive coating. In one particular embodiment of the invention, the first element is spaced from the peripheral edge of the substrate and the second element is positioned between the first element and the substrate edge. The antenna may be incorporated into a laminated vehicle windshield by securing an additional glass ply to the first glass substrate such that the first and second coating elements are positioned between the glass plies.

The present invention also discloses a method of making a glass antenna. First and second electroconductive antenna elements are applied to a major surface of a glass ply, with the first element being spaced from the second element. An electroconductive connector is secured to glass ply such that first portions of the connector overlay and are electrically interconnected with a portion of both the first and second antenna elements and a second portion of the connector extends beyond the periphery of the glass ply. A second glass play may be combined to the first ply with the antenna elements positioned therebetween to form a laminated transparency with an integral, transparent antenna.

DETAILED DESCRIPTION OF THE INVENTION

Figure 1:
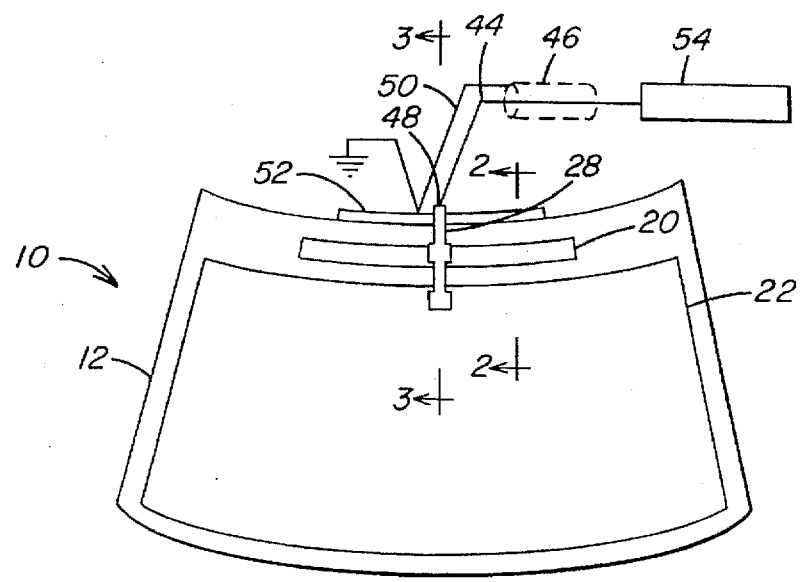
FIG. 1 is a plan view of a transparent glass antenna incorporating features of the present invention.

FIG. 1 illustrates a transparent antenna incorporating the features of the present invention. More specifically, antenna 10 is a laminated vehicle windshield 12 formed by outer and inner glass plies 14 and 16 bonded together by a plastic interlayer 18, preferably polyvinylbutyral, to form a unitary structure. It should be appreciated that plies 14 and 16 may be other transparent, rigid material, e.g. polycarbonate. Windshield 12 further includes a first antenna element 20 spaced from a second antenna element 22. In the particular embodiment illustrated in FIG. 1, element 20 extends along an upper portion of windshield 12 and element 22 is positioned below element 20 and generally occupies the central portion of ply 14 which comprises a major portion of the vision area of the transparency. The elements 20 and 22 are preferably transparent electroconductive coatings applied on surface 24 of glass ply 14 (as shown in FIG. 1) or on surface 26 of ply 16, in any manner well known in the art. The coating may be a single or multiple layer, metal containing coating for example, as disclosed in U.S. Pat. Nos. 3,655,545 to Gillery et al.; 3,962,488 to Gillery and 4,898,789 to Finley. It should be appreciated that the coating elements 20 and 22 may be oriented relative to each other in configurations other than that shown in FIG. 1. For example, element 20 may be positioned off-center or between coating element 22 and a side or bottom edge of the windshield 12. A connector 28, as will be discussed later in more detail, is electrically connected to and extends between elements 20 and 22.

Although it is preferred that element 20 be a transparent coating, since in the particular embodiment of the invention shown in FIG. 1, it is not in the major vision area of the windshield 12, element 20 may be some other type of nontransparent electroconductive material, e.g. silver containing ceramic paint, metal foil, etc. It should be appreciated that this applies to any antenna element that does not obstruct the main viewing area of the windshield 12. As a result, it is contemplated that the antenna 10 may include multiple elements positioned outside the central viewing area of the windshield 10, for example two or more elements positioned in the upper portion of the windshield, and further that some if not all of these elements are nontransparent electroconductive materials as discussed above.

It is also contemplated that the antenna elements may be electroconductive wire mesh or screen members.

With continued reference to FIG. 1, elements 20 and 22 in this particular configuration are basically quadrilateral in shape and preferably spaced from the peripheral edge of the windshield 12, although it is contemplated that the antenna 10 may have other multi-element configurations. The exact shape and position of each element and the spacing between the elements depends, in part, on the design of the vehicle in which the windshield 12 will be installed, the angle of installation, the coating resistivity, the type of signal to be transmitted or received, and the desired performance of the antenna. These types of design considerations for a transparent glass antenna are discussed in U.S. Pat. Nos. 4,768,037; 4,849,766 and 5,083,135.

Connector 28 includes a flat electroconductive member 30 which extends between and is electrically connected to elements 20 and 22. More specifically, lower portion 32 of member 30 overlays a portion of lower element 22 and a central portion 34 of member 30 overlays a portion of upper element 20. Upper portion 36 of member 30 extends outwards from the periphery of the windshield 12 to provide means to electrically connect the antenna 10 to a radio wave receiving and/or transmitting device, as will be discussed later. Member 30 of conductor 28 is preferably fabricated from a flat metal sheet such as stainless steel, copper, tin or any other electroconductive material. If required, combinations of materials such as stainless steel coated with copper, tin or silver may be used to enhance conductivity and strength. In addition, the connector may also be formed from a metal mesh or electroconductive plastic.

Figure 2:
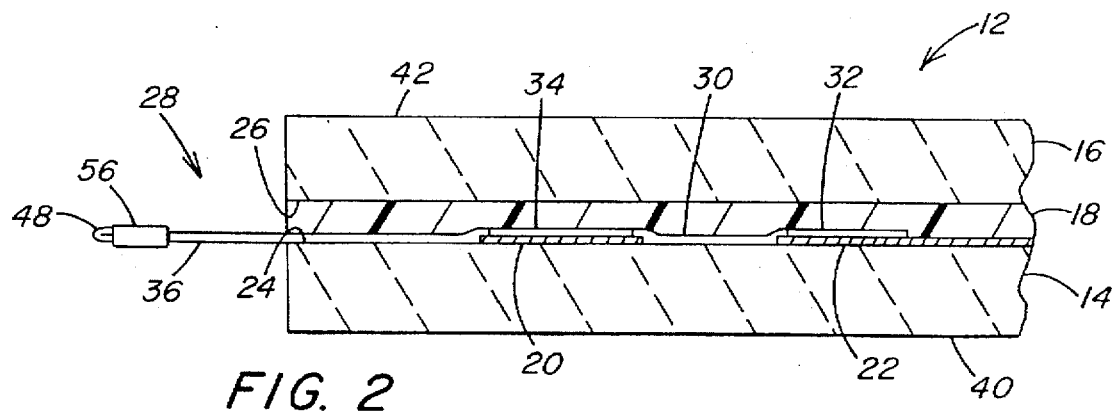
FIG. 2 is a sectional view taken along line 2—2 in FIG. 1, with portions removed for clarity.
Figure 3:
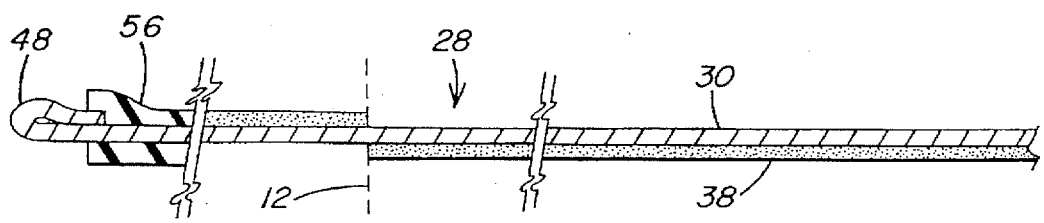
FIG. 3 is a sectional view taken along line 3—3 of FIG. 1, with portions removed for clarity.

Referring to FIGS. 2 and 3, in one particular embodiment, connector 28 includes an adhesive 38 applied to member 30 to secure member 30 to elements 20 and 22 on surface 24 of glass ply 14 (shown only in FIG. 3). The electrical connection between elements 20 and 22 and member 30 may be either a direct connection or a capacitive connection. More particularly, the adhesive may be electrically conductive to provide a direct electrical connection between elements 20 and 22 and member 30 or it may be non-conductive so that the electrical connection between elements 20 and 22 and member 30 is capacitive. It has been found that a capacitive connection may be used to produce a capacitive reactance that matches the inductive reactance of the antenna to the coaxial cable by minimizing the net reactive component as disclosed in U.S. Pat. No. 5,355,144 to Walton, et al. The size of lower portion 32 and central portion 34 of connector 28 may be adjusted, if required, based in part on the spacing between member 30 and antenna elements 20 and 22, the type of materials used for the elements 20 and 22, member 30 and adhesive 38, and the desired electrical characteristic, to provide the proper match. It should be appreciated that with a direct connection between member 30 of connector 28 and elements 20 and 22, the width of connector 28 may not have to be increased to provide the required electrical connection. In addition, although the shape of portions 32 and 34 in FIG. 1 is rectangular, it should be further appreciated that these enlarged portion of connector member 30 may be any required shape necessary to effect the desired connection.

Although FIG. 2 shows the connector 28 positioned along surface 24 of ply 14, it should be appreciated that connector 28 may also be positioned internally within windshield 12 along surface 26 of ply 16 or externally along major surface 40 of ply 14 or surface 42 of ply 16. Since such arrangements inherently provides a capacitive connection between elements 20 and 22 and connector 28 due to the glass and/or plastic plies being disposed between the antenna elements 20 and 22 and member 30, the area of member 30 at lower portions 32 and 34 may have to be increased, as discussed above, to provide the required electrical characteristic. It should be appreciated that with the connector 28 being secured externally to the windshield 12, the windshield may be fabricated without connector 28, which may be added at a later time.

As an alternative, member 30 of connector 28 may be secured within windshield 12 without the use of any additional adhesive. More particularly, the member 30 may be held in place by the plastic layer 18 which is positioned between the glass plies 14 and 16 of the windshield laminate. Provided that the member 30 does not have a dielectric coating over those portions that overlay the antenna elements, there will be a direct electrical connection between connector 28 and coating elements 20 and 22. If the member 30 has a dielectric coating or if it is positioned along surface 26 of ply 16, then the electrical connection between connector 28 and elements 20 and 22 will be capacitive.

Portion 36 of connector member 30 extends outward of the windshield 12 and is connected to the inner conductor 44 of a coaxial cable 46. This connection may be a soldered, glued or clip-on type connection. If desired, the effective thickness of end 48 of portion 36 of member 30 may be increased to make a rigid, integral connection terminal and thus easier to make the required connection. For example, additional material may be adhered to the end 48, or end 48 may be folded to increase the number of plies of material at the terminal. In addition, the folded end may be crimped to further increase the effective thickness and rigidity of the terminal at end 48 of the connector 28. In one particular embodiment of the invention, end 48 is folded and crimped to form a spade-type connector that is readily receivable by a conventional connection device at the end of conductor 44 of cable 46. The outer conductor or shield 50 of the cable 46 is electrically connected to a ground point on the vehicle body, and more particularly, to the metal frame 52 (a portion shown in FIG. 1 only) of the vehicle surrounding the windshield 12. The cable 46 electrically connects the elements 20 and 22 to a radio wave receiver and/or transmitter 54. It is preferred that the ground point be generally located as close as possible to the connection between conductor 44 and connector 28. In the particular embodiment shown in FIG. 1, the connector 28 is positioned at the top center of the windshield 12, but it should be appreciated that the connector location may be changed if required to provide the desired antenna performance. In addition, multiple connectors 28 may be provided to electrically interconnect elements 20 and 22 at a plurality of locations along the windshield 12.

In one particular embodiment of the invention the upper element 20 is a transparent, electroconductive coating approximately 2 in.×24 in. (5.1 cm×61 cm) centered on surface 24 of glass ply 14 and positioned approximately 3 in. (7.6 cm) from the upper edge. Lower element 22 is a transparent, electroconductive coating approximately 28 in.×56 in. (71 cm×144 cm) centered on surface 24 of glass ply 14 and positioned approximately 1 in. (2.5 cm) below upper element 20. The spacing from the edge of element 22 to the edge of the windshield 12 varies but it has been found that to optimize the performance of a coating glass antenna, the coating elements should be kept at least a minimum distance of 0.25 in. (6.4 mm) from the metal frame 52. Both coatings are the same multi-layered coating of a type discussed earlier with a resistivity of approximately 3 ohms per square. Although not required, it is preferred that connector 28 be positioned in the central portion of the windshield 12, i.e. within the central third of the windshield edge, and more preferably at the center of the windshield 12.

The total thickness of member 30 and adhesive 38 of connector 28 within the windshield 12 should be kept to a minimum to minimize the potential of air bubbles forming at or near the connector 28 resulting from air being entrapped in the laminated windshield structure in the vicinity of the connector 28 during its assembly and laminating operations, which are well known in the art. The bubbles may adversely affect the strength of the windshield at the connection and detract from its appearance. It has been determined that when using conventional roll pressing and laminating techniques which are well known in the art, it is preferred that the total thickness of the connector 28, i.e. the member 30 and adhesive 38, should not exceed 0.004 in. (0.10 mm) to minimize the formation of bubbles within the windshield 12. Member 30 is preferably made from stainless steel with a metal thickness ranging from 0.0005 in. to 0.002 in. (0.013 mm to 0.05 mm), although the thinner connectors are flimsy and more difficult to handle than the thicker connectors. The adhesive 38 is applied as a double faced tape, an adhesive spray, or any other type of adhesive system well known in the art, at a thickness preferably ranging from 0.001 in. to 0.002 in. (0.025 mm to 0.05 mm). It was observed that at thinner amounts, the adhesive did not make good optical contact with the glass surface, i.e. defects in the adhesive were visible through the glass substrate, although it is believed that such defects do not effect the electrical performance of the connection. It should be noted that if the adhesive 38 within the windshield 12 is eliminated, the thickness of member 30 may be increased.

In order to minimize the visual appearance of the connector 28 from outside of the vehicle, the width of the connector 28 should also be kept at a minimum, although as discussed earlier, the width of selected portions of connector 28, and more particularly lower portion 32 and/or central portion 34, may be increased to provide the necessary electrical connection to electroconductive antenna elements 22 and 20, respectively. However, the width must be sufficient to provide the connector with the required conductivity. More particularly, if the cross-sectional area of the connector 28 is too small, the resistive loss will not allow the desired current flow to pass from elements 20 and 22 to the radio receiver/transmitter 54 through the connector 28. If desired, portion 36 of member 30 may be widened as it exits the windshield 12 to increase the strength of the connector 28 outside the laminate and make it easier to connect to the coaxial cable 46. Connectors 28 have been made with the portion of member 30 laminated within the windshield 12 having a width ranging from 0.01 in. to 0.25 in. (2.5 mm to 6.4 mm), although the thinner connectors are flimsy and more difficult to handle than the thicker connectors. To further hide the connector 28, it may be processed or coated to provide a less noticeable colored surface, e.g. black.

In one particular embodiment of the invention, member 30 of connector 28 is a flat stainless steel substrate approximately 0.0015 in. (0.038 mm) thick and generally 0.25 in. (6.4 mm) wide. The width of the lower portion 32 and central portion 34 is increased to form a connection area of approximately 0.75 in.×0.75 in. (19 mm×19 mm) to improve the connection between member 30 and elements 22 and 20, respectively. The adhesive 38 is a double sided, electrically non-conductive adhesive tape, for example as is available from 3M Company, St. Paul, Minn. as adhesive product no. 9482, approximately 0.002 in. (0.05 mm) thick, so that the total uninstalled thickness of this particular connector is approximately 0.0035 in. (0.088 mm). As an alternative, an electrically conductive adhesive, e.g. 3M Company product no. 9703, may be used to secure portions 32 and 34 to elements 20 and 22, respectively. Although not required, connector 28 may include adhesive along the section of upper portion 36 of member 30 that is positioned within the windshield 10 and between portions 32 and 34 as shown in FIG. 3. If desired, connector 28 may also include an adhesive, such as 3M Company product no. 9485, applied to either surface of the section of upper portion 36 which extends outside of the windshield 12 so that this section of the connector 28 may be secured to either major surface 40 or 42 of plies 14 and 16, respectively, during processing of the windshield 12 and/or hold the connector 28 in place after it has been electrically connected to conductor 44 of coaxial cable 46. End 48 of connector 28 is folded and crimped to form a terminal which is capable of being received within a mating contact from conductor 44. In addition, selected sections of portion 36, including portions of the connection terminal, may be covered, e.g. by a shrink wrap 56 as is well known in the art, to electrically insulate the connector 28 and prevent it from contacting the vehicle frame 52 when installed and causing the antenna 10 to malfunction. If desired, the shrink wrap 56 may extend from the integral terminal at end 48 to the edge of the windshield 12 and further, the shrink wrap 56 may be coated with an adhesive to secure this portion of the connector 28 in place along an outer major surface of the windshield 12. In one particular embodiment of the invention where end 48 is folded to form an integral terminal, the shrink wrap 56 covers a portion of the terminal to assist in holding the multiple plies forming the terminal together.

The windshield 12 should be sealed where the connector 28 exits the laminate to prevent moisture from entering the windshield at this location. The sealant may be applied directly to the member 30 or to the interior portion of the windshield 12 or to the edge of the windshield 12 after the assembly has been laminated. In one particular embodiment of the invention, an adhesive be applied at least to that section of portion 36 of member 30 where it exits the windshield 12. More specifically, referring to FIG. 3, adhesive is applied to the surface of member 30 which is secured to glass surface 24 up to the edge of the windshield 12. This adhesive in combination with the plastic interlayer 18 seals the member 30 within the windshield 12 and prevents ingress of moisture into the windshield assembly at the connector 28.

In fabricating an antenna 10 as disclosed herein, a transparent, electroconductive coating is applied to glass ply 14 in a manner well known in the art. Ply 14 is masked to provide the desired patterns, and for the particular embodiment shown in FIG. 1, two distinct antenna elements are formed. As an alternative, the entire surface 24 of ply 14 may be coated and thereafter selected portions of the coating may be removed to provide the desired antenna pattern. After the coating is applied to ply 14, it is heated to its heat softening temperature and shaped by techniques well known in the art, e.g. press bending. As an alternative, after the coating is applied, ply 14 may be combined with ply 16 and the two plies may be shaped simultaneously by techniques well known in the art, e.g. gravity sag bending. If desired, ply 14 may be shaped prior to applying the antenna elements. Connector 28 is then secured in place along surface 24 of ply 14 and plies 14 and 16 are combined with interlayer 18 positioned therebetween. The assembly is then laminated in a manner well known in the art to form a unitary structure. It should be appreciated that if connector 28 is attached to the exterior of the windshield 12, it is not necessary to secure it in place until after lamination.

Figure 4:
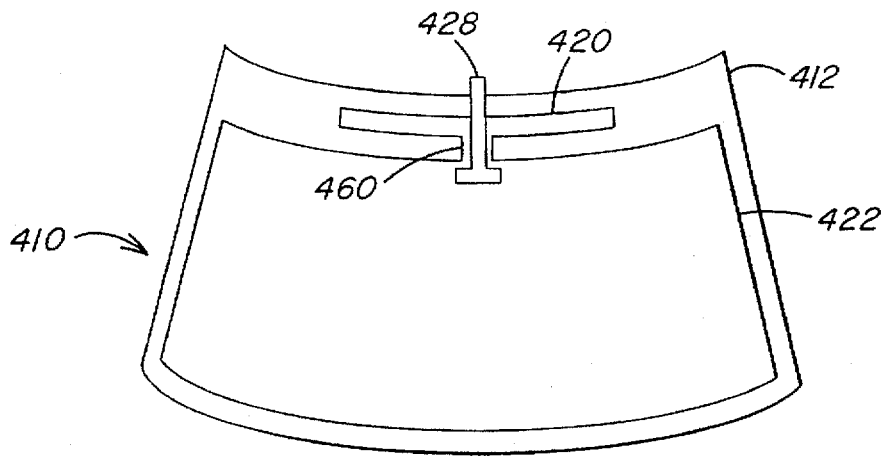
FIGS. 4, 5, 6 and 7 are plan views of alternate embodiments of a glass antenna incorporating features of the invention.

Although the antenna and connector configuration disclosed herein illustrate an arrangement of spaced apart antenna elements, it is contemplated that the connector arrangement may also be used in an antenna configuration where the antenna elements are interconnected by an additional coating element. Referring to FIG. 4, coating 460 of antenna 410 electrically interconnects coated antenna elements 420 and 422. Although not required, connector 428 in FIG. 4 is positioned over and secured to coating element 460 as well as elements 420 and 422. This arrangement provides an increase in connecting area between the connector 428 and the antenna elements for both a direct and capacitive connection without increasing the width of the connector. In addition, it is contemplated that the connector 428 and/or element 460 may be positioned at locations other than the center of windshield 412.

Figure 5:
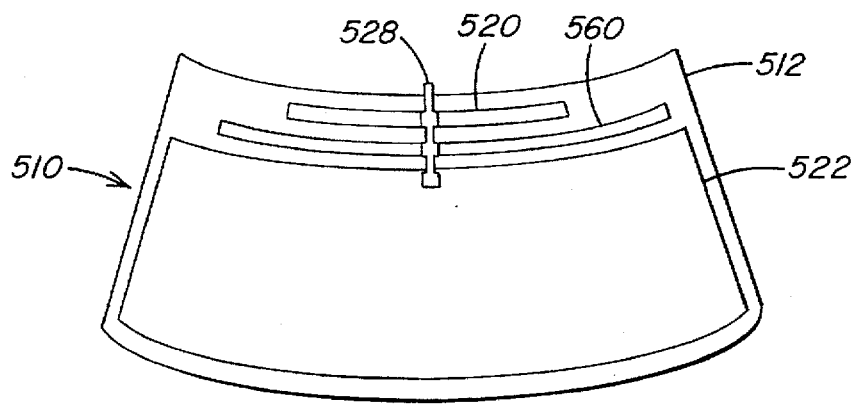

It should be appreciated that although the embodiment of the invention shown in FIGS. 1 and 2 include two coating elements with a connector positioned at the top center of windshield 12, other antenna configurations may incorporate the teachings of the present invention. For example, FIG. 5 illustrates an antenna 510 with an upper element 520, lower element 522 and third central element 560. Connector 528 electrically interconnects at least two of the elements, and preferably all three elements, and provides a terminal for connecting to a radio wave receiver/transmitter (not shown in FIG. 5) as discussed earlier. Furthermore, connector 528 may be positioned at locations other than the center of windshield 512. It is noted that using additional elements as shown in FIG. 5 facilitates the use of both symmetric and asymmetric coating configurations which may be useful in optimizing the antenna pattern based on the design of the vehicle in which the windshield will be installed.

Figure 6:
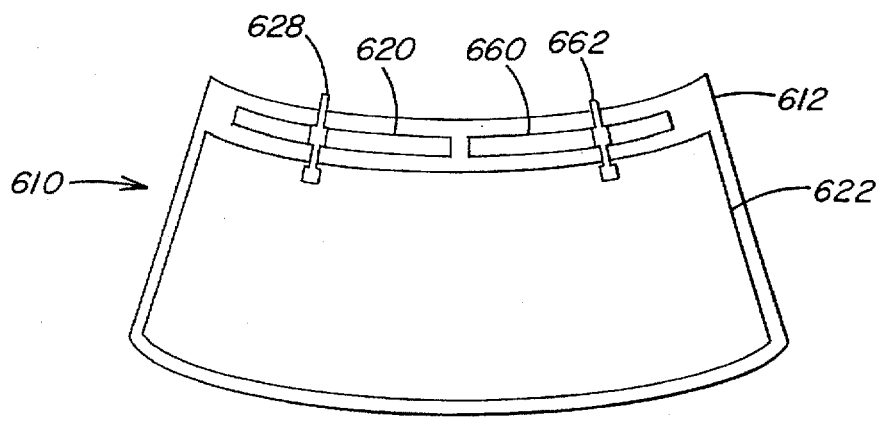

FIG. 6 illustrates an embodiment of the invention including additional antenna elements that are not positioned between elements 20 and 22. More particularly, electroconductive coating elements 620 and 660 of antenna 610 are positioned within windshield 612 next to each other and spaced from element 622. Connector 628 interconnects elements 620 and 622 while connector 662 interconnects elements 660 and 622. A cable from a receiver/transmitter (not shown in FIG. 6) is connected to both connectors.

Figure 7:
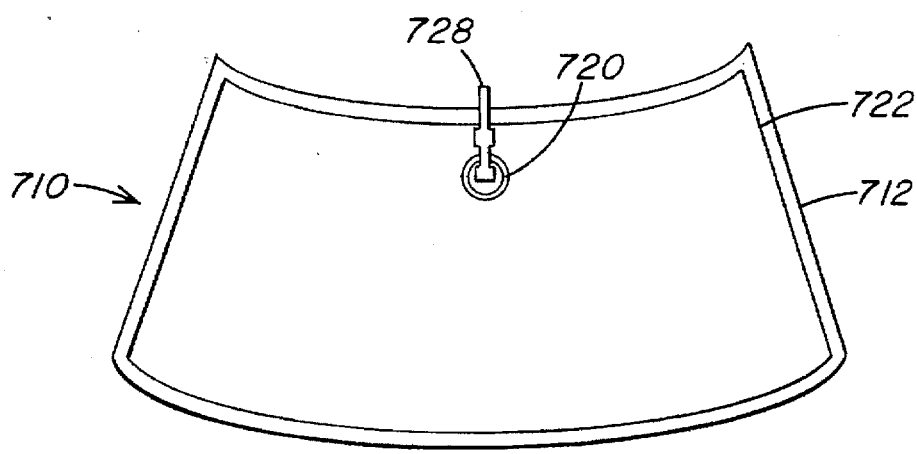

FIG. 7 illustrates another glass antenna 710 configuration incorporating features of the present invention. Element 720 of glass antenna 712 is a transparent, electroconductive coating element positioned within a larger transparent, electroconductive element 722, with connector 728 electrically interconnecting both elements. Although the shape of element 720 in FIG. 7 is circular, this element may have any configuration required to provide antenna 712 with the desired performance and/or aesthetics.

Figure 8:
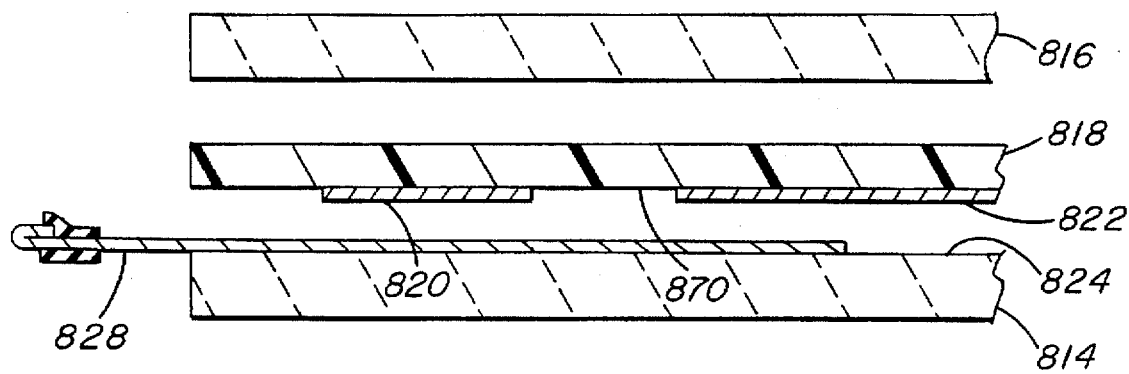
FIG. 8 is an exploded sectional view similar to FIG. 2, illustrating an alternate embodiment of a glass antenna incorporating features of the invention.

As an alternative to positioning the antenna elements directly on one of the glass plies, the elements may be formed on or within the plastic ply of the windshield. More particularly, referring to FIG. 8, antenna elements 820 and 822 are formed on major surface 870 of interlayer 818. Connector 828 may be secured to the coated surface 870 or to any of the major surfaces of glass sheets 814 and 816. If connector 828 is positioned on surface 824 of ply 818 as shown in FIG. 8 or on surface 870 of interlayer 818 and includes an electroconductive adhesive between the connector and antenna elements, there will be a direct electrical connection between connector 828 and elements 820 and 822. If connector 828 includes a non-electroconductive adhesive or is positioned along any of the other major surfaces of the glass sheet 814 and 816, there will be a capacitive connection.

It should be appreciated that although the embodiments of the invention discussed above disclose an antenna incorporated within a laminated windshield, the antenna and connector of the present invention may also be incorporated on a single rigid, transparent ply.

With the present invention, at least two distinct and separate transparent antenna elements are formed to produce a glass antenna. By eliminating the need to interconnect the major antenna elements with additional coating elements, simplified masking systems may be used to produce antenna elements with distinct coating deletion lines, without the problem of modifying the deletion pattern to provide a coating connection between elements which in turn will increase the complexity of any coating operation and may affect the aesthetics of the final product. However, as discussed earlier, an additional coating may be used to interconnect the antenna elements in the present invention to provide the desired antenna performance and/or required connection between the coating elements and the connector. It is believed that since the connector 28 is a more highly conductive element as compared to a coating section interconnecting elements 20 and 22, there will be less loss of radio wave signals as they pass through the elements to the connector 28 and to the receiver/transmitter. In addition, the antenna and connector arrangement as disclosed herein provides the capability to make a direct electrical connection or a capacitive connection with each antenna element 22. Furthermore, by positioning member 30 of the connector 28 such that it extends over multiple antenna elements, different combinations of connections to the antenna elements may be made. For example, with a two element arrangement as shown in FIG. 1, the connection between lower portion 30 and element 22 may be either direct or capacitive and similarly the connection between central portion 32 and element 20 may be either direct or capacitive.

The invention described and illustrated herein represents a description of illustrative preferred embodiments thereof. It is understood that various changes may be made without departing from the gist of the invention defined in the claims set to follow.

We claim:

1. A method of making a transparent antenna comprising the steps of:

applying first and second transparent electroconductive antenna elements on a major surface of a flexible plastic ply, said second element being spaced from said first element; and securing said plastic ply to a glass ply such that said first antenna element is spaced from a peripheral edge of said glass ply and said second antenna element is positioned between said first antenna element and said peripheral edge, and said first and second antenna elements are positioned between said plastic ply and said glass ply; and prior to said securing step, positioning an electroconductive connector between said plastic ply and said glass ply such that a first portion of said connector overlays and is electrically interconnected with a portion of said first antenna element, a second portion of said connector overlays and is electrically interconnected with a portion of said second antenna element, a third portion of said connector extends between and electrically interconnects said first and second portions of said connector, and a fourth portion of said connector extends from said second portion and outwardly from between said plastic ply and said glass ply so as to electrically interconnect said first and second antenna elements between said plastic ply and said glass ply and form a single antenna assembly.

2. A transparent antenna for an automobile comprising:

a first rigid transparent ply having a peripheral edge defining a desired shape;

a first transparent electroconductive antenna element positioned at least on a central portion of a major surface of said first ply and spaced from and generally extending along selected portions of said peripheral edge of said first ply;

a second transparent electroconductive antenna element positioned on said major surface of said first ply spaced between said first antenna element and said selected portions of said peripheral edge of said first ply;

at least one electroconductive connector extending between said first and second antenna elements to electrically interconnect said elements and form a single antenna assembly, wherein a first portion of said connector overlays and is electrically interconnected with a portion of said first antenna element, a second portion of said connector overlays and is electrically interconnected with a portion of said second antenna element, a third portion of said connector extends between and electrically interconnects said first and second portions of said connector, and a fourth portion of said connector extends from said second portion and beyond said peripheral edge of said first ply; and a second rigid transparent ply secured to said first rigid ply such that said first and second antenna elements and at least said first, second and third portions of said connector are positioned between said plies, wherein said second ply has a peripheral edge generally corresponding to said peripheral edge of said first ply at least in the vicinity where said connector extends beyond said first ply.

3. The antenna as in claim 2 wherein said first and second rigid transparent plies are first and second glass plies and said first and second transparent electroconductive antenna elements are first and second electroconductive coatings.

4. The antenna as in claim 3 further including an additional transparent, electroconductive coating element electrically interconnecting said first and second antenna elements and wherein said third portion of said connector overlays at least a portion of said additional element.

5. The antenna as in claim 3 wherein said connector is a first connector and further including additional connectors spaced from said first connector and extending between and electrically interconnecting said antenna elements, wherein a first portion of each of said additional connectors overlays and is electrically interconnected with a portion of said first antenna element, a second portion of each of said additional connectors overlays and is electrically interconnected with a portion of said second antenna element, a third portion of each of said additional connectors extends between and electrically interconnects said first and second portions of a corresponding one of said additional connectors, and a fourth portion of each of said additional connectors extends from a corresponding one of said second portions of said additional connectors, and at least said first, second and third portions of each of said additional connectors are secured between said first and second glass plies and said fourth portion of each of said additional connectors extends beyond said peripheral edge of said first glass ply.

6. The antenna as in claim 3 wherein said first and second portions of said connector are capacitively connected to said portions of said first and second antenna elements.

7. The antenna as in claim 3 wherein said first and second portions of said connector are in direct electrical contact with said portions of said first and second antenna elements.

8. The antenna as in claim 3 further including at least one additional electroconductive antenna element positioned between said first and second antenna elements and said connector further includes an additional portion which overlays and is electrically interconnected with said at least one additional antenna element.

9. The antenna as in claim 3 further including at least one additional antenna element positioned between said first antenna element and said selected portions of said peripheral edge of said first glass ply, and a second connector electrically interconnecting said at least one additional antenna element and said first antenna element, wherein a first portion of said second connector overlays and is electrically interconnected with a portion of said first antenna element, a second portion of said second connector overlays and is electrically interconnected with a portion of said at least one additional antenna element, a third portion of said second connector extends between and electrically interconnects said first and second portion of said second connector, a fourth portion of said second connector extends from said second portion of said second connector, and at least said first, second and third portions of said second connector are secured between said first and second glass plies and said fourth portion of said second connector extends beyond said peripheral edge of said first glass ply.

10. The antenna as in claim 3 wherein said connector is positioned along a major surface of said second glass ply.

11. The antenna as in claim 3 wherein said second element is positioned between said first element and an upper edge of said first glass ply.

12. The antenna as in claim 11 wherein said connector is positioned along said major surface of said first glass ply.

13. The antenna as in claim 12 wherein said connector has a maximum thickness of 0.10 mm.

14. The antenna as in claim 13 wherein said coatings have a resistivity of approximately 3 ohms per square.

15. The antenna as in claim 13 wherein said fourth portion of said connector includes an integral terminal for connection of said antenna elements to a radio wave receiving/transmitting device.

16. The antenna as in claim 3 further including a transparent plastic ply positioned between said first and second glass plies and overlaying said first and second antenna elements to secure said first glass ply to said second glass ply.

17. A method of making a transparent antenna comprising the steps of:

applying a first transparent electroconductive antenna element on a major surface of a first rigid transparent ply having a peripheral edge defining a desired shape, said first element extending along and being spaced from selected portions of said peripheral edge;

applying a second transparent electroconductive antenna element on said major surface of said first ply spaced between said first antenna element and said selected portions of said first ply's peripheral edge;

positioning an electroconductive connector along said first ply such that a first portion of said connector overlays and is electrically interconnected with a portion of said first antenna element, a second portion of said connector overlays and is electrically interconnected with a portion of said second antenna element, a third portion of said connector extends between and electrically interconnects said first and second portions of said connector, and a fourth portion of said connector extends from said second portion and beyond said peripheral edge of said first ply; and securing a second rigid transparent ply having a peripheral edge generally corresponding to said peripheral edge of said first ply, to said first ply such that said first and second antenna elements and at least said first, second and third portions of said connector are positioned between said first and second plies and said fourth portion of said connector extends beyond said peripheral edges of said first and second plies such that said connector electrically interconnects said first and second antenna elements between said first and second rigid plies and forms a single antenna assembly.

18. The method as in claim 17 wherein said first and second plies are first and second glass plies and further including the step of shaping said first and second glass plies to a desired configuration prior to said securing step.

19. The method as in claims 18 further including the step of securing said connector to said major surface of said first glass ply.

20. The method as in claim 18 further including the step of securing said connector to a major surface of said second glass ply.

21. A transparent antenna assembly for an automobile comprising:

a first glass ply having a peripheral edge defining a desired shape;

a first transparent electroconductive coating covering a substantial portion of a major surface of said first ply, said first coating being spaced from selected portions of said peripheral edge of said first ply;

a second transparent electroconductive coating positioned on said major surface of said first ply spaced between said first coating and said selected portions of said peripheral edge of said first ply, wherein said first and second coatings are first and second antenna elements;

a second glass ply having a peripheral edge generally corresponding to said peripheral edge of said first ply, laminated to said first glass ply such that said first and second coatings are positioned between said plies; and a flat metal connector electrically interconnecting said first and second antenna elements between said first and second glass plies and having a first portion which overlays and is electrically interconnected with a portion of said first antenna element, a second portion which overlays and is electrically interconnected with a portion of said second antenna element, a third portion which extends between and electrically interconnects said first and second portions of said connector, and a fourth portion which extends from said second portion and outwardly from between said plies beyond said peripheral edges of said first and second plies, wherein said interconnected first and second antenna elements form a single antenna assembly.

* * * * *